US010410198B2

(12) United States Patent
Yamaguchi et al.

(10) Patent No.: US 10,410,198 B2
(45) Date of Patent: Sep. 10, 2019

(54) INFORMATION PROCESSING DEVICE, INFORMATION PROCESSING METHOD, AND PROGRAM

(71) Applicant: NEC Corporation, Minato-ku, Tokyo (JP)

(72) Inventors: Hiroyasu Yamaguchi, Tokyo (JP); Motoko Miura, Tokyo (JP); Takuro Sakuma, Tokyo (JP)

(73) Assignee: NEC CORPORATION, Tokyo (JP)

(*) Notice: Subject to any disclaimer, the term of this patent is extended or adjusted under 35 U.S.C. 154(b) by 161 days.

(21) Appl. No.: 15/322,224

(22) PCT Filed: Jun. 29, 2015

(86) PCT No.: PCT/JP2015/068634
§ 371 (c)(1),
(2) Date: Dec. 27, 2016

(87) PCT Pub. No.: WO2016/002697
PCT Pub. Date: Jan. 7, 2016

(65) Prior Publication Data
US 2017/0140361 A1 May 18, 2017

(30) Foreign Application Priority Data
Jul. 1, 2014 (JP) ................................ 2014-136165

(51) Int. Cl.
G06Q 20/20 (2012.01)
G07G 1/12 (2006.01)
(Continued)

(52) U.S. Cl.
CPC ....... *G06Q 20/208* (2013.01); *G06K 7/10554* (2013.01); *G06K 7/1413* (2013.01); *G07G 1/0045* (2013.01); *G07G 1/12* (2013.01)

(58) Field of Classification Search
CPC ...... G06Q 20/208; G07G 1/0045; G07G 1/12; G06K 7/10554; G06K 7/1413
See application file for complete search history.

(56) References Cited

U.S. PATENT DOCUMENTS

| 8,712,853 B2 * | 4/2014 | Iizaka ................ G06Q 30/0207 705/14.1 |
| 2002/0116267 A1 * | 8/2002 | Weisz ..................... G06Q 30/02 705/14.1 |

(Continued)

FOREIGN PATENT DOCUMENTS

| JP | 2003-085657 A | 3/2003 |
| JP | 2011-221585 A | 11/2011 |
| JP | 2014-052798 A | 3/2014 |

OTHER PUBLICATIONS

Higgins, Randy. "AX 2012 R2 for Retail—Setting up discount coupons with bar codes for scanning into POS". Retrieved from <https://cloudblogs.microsoft.com/dynamics365/no-audience/2013/01/25/ax-2012-r2-for-retail-setting-up-discount-coupons-with-bar-codes-for-scanning-into-pos/>. Originally published Jan. 2013.*

(Continued)

*Primary Examiner* — Nathan A Mitchell

(57) ABSTRACT

An information processing device (10) includes a commodity detection unit that detects a commodity information symbol, a service detection unit (120) that detects a service information symbol, and an association unit (130) that associates commodity information obtained using a commodity information symbol corresponding to a shorter time period, out of a time period from detection of a commodity information symbol to detection of a service information symbol and a time period from the detection of the service information symbol to detection of a commodity information symbol, with service information obtained using the service information symbol.

6 Claims, 9 Drawing Sheets

(51) Int. Cl.
    *G06K 7/10*       (2006.01)
    *G06K 7/14*       (2006.01)
    *G07G 1/00*       (2006.01)

(56) References Cited

U.S. PATENT DOCUMENTS

| | | | |
|---|---|---|---|
| 2004/0050941 A1* | 3/2004 | Hanyu | G09F 3/02 |
| | | | 235/487 |
| 2011/0243446 A1* | 10/2011 | Iizaka | G06Q 30/0207 |
| | | | 382/182 |
| 2014/0063566 A1 | 3/2014 | Naito | |

OTHER PUBLICATIONS

"How to . . . barcode money-off coupons". Retrieved from <https://www.gs1uk.org/~/media/documents/marketing-documents/94702_howtoguidesbarcoding-moneyoff-coupons_0315_fv.pdf?la=en>. 2016.*
International Search Report for PCT Application No. PCT/JP2015/068634, dated Sep. 8, 2015.

* cited by examiner

US 10,410,198 B2

INFORMATION PROCESSING DEVICE, INFORMATION PROCESSING METHOD, AND PROGRAM

This application is a National Stage Entry of PCT/JP2015/068634 filed on Jun. 29, 2015, which claims priority from Japanese Patent Application 2014-136165 filed on Jul. 1, 2014, the contents of all of which are incorporated herein by reference, in their entirety.

TECHNICAL FIELD

The present invention relates to a technique for associating commodity information and service information with each other by using a commodity image.

BACKGROUND ART

Commodities displayed in a store include a commodity to which a seal indicating price reduction information of the commodity is attached together with a bar code for identifying the commodity. An operator of a point of sale (POS) terminal makes the POS terminal read a bar code given to a commodity and then views a price reduction seal attached to the commodity, thereby performing a price reduction operation.

Patent Document 1 mentioned below proposes a POS terminal that performs checkout of a commodity to which a bar code indicating commodity information and a bar code indicating price reduction information are attached. The POS terminal further reads not only the bar code indicating commodity information but also the bar code indicating price reduction information to thereby perform the price reduction of a target commodity.

RELATED DOCUMENT

Patent Document

[Patent Document 1] JP-A-2003-85657

SUMMARY OF THE INVENTION

Technical Problem

In the proposed method described above, the POS terminal detects a bar code (commodity information symbol) indicating commodity information and a bar code (service information symbol) indicating price reduction information. However, in such a POS terminal, the detected order of the commodity information symbol and the service information symbol may not be fixed. There is a possibility that a commodity information symbol is detected first and then a service information symbol is then detected in a certain commodity, and a service information symbol is detected first and then a commodity information symbol is then detected in the next commodity. Such a case is caused by an operator's different ways of holding a commodity over a scanning apparatus of a POS terminal, the different arrangement of symbols in commodities, and the like. In addition, a commodity having service information attached thereto and a commodity having no service information attached thereto are present, and thus it is desired that commodity information of a target commodity and service information attached to the commodity are correctly associated with each other in a POS terminal.

The invention provides a technique for correctly associating commodity information of a commodity and service information attached to the commodity with each other.

Solution to Problem

In aspects of the invention, the following configurations are adopted in order to solve the above-described problems.

A first aspect relates to an information processing device. The information processing device according to the first aspect includes a commodity detection unit that detects a commodity information symbol, a service detection unit that detects a service information symbol, and an association unit that associates commodity information obtained using a commodity information symbol corresponding to a shorter time period, out of a time period from detection of a commodity information symbol to detection of a service information symbol and a time period from the detection of the service information symbol to detection of a commodity information symbol, with service information obtained using the service information symbol.

A second aspect relates to an information processing method performed by at least one computer. The information processing method according to the second aspect includes detecting a commodity information symbol, detecting a service information symbol, and associating commodity information obtained using a commodity information symbol corresponding to a shorter time period, out of a time period from detection of a commodity information symbol to detection of a service information symbol and a time period from the detection of the service information symbol to detection of a commodity information symbol, with service information obtained using the service information symbol.

Meanwhile, another aspect of the invention relates to a program causing at least one computer to perform the method of the second aspect, and relates to a computer readable recording medium having the program recorded thereon. The recording medium includes a non-transitory tangible medium.

Advantageous Effects of Invention

According to the invention, it is possible to correctly associate commodity information of a commodity and service information attached to the commodity with each other.

BRIEF DESCRIPTION OF THE DRAWINGS

The above-described objects, other objects, features and advantages will become more apparent from the preferred exemplary embodiments described below, and the accompanying drawings as follows.

DESCRIPTION OF EXEMPLARY EMBODIMENTS

Hereinafter, exemplary embodiments of the invention will be described. Meanwhile, the following exemplary embodiments are just examples, and the invention is not limited to configurations of the following exemplary embodiments.

First Exemplary Embodiment

[Processing Configuration]

Figure 1:
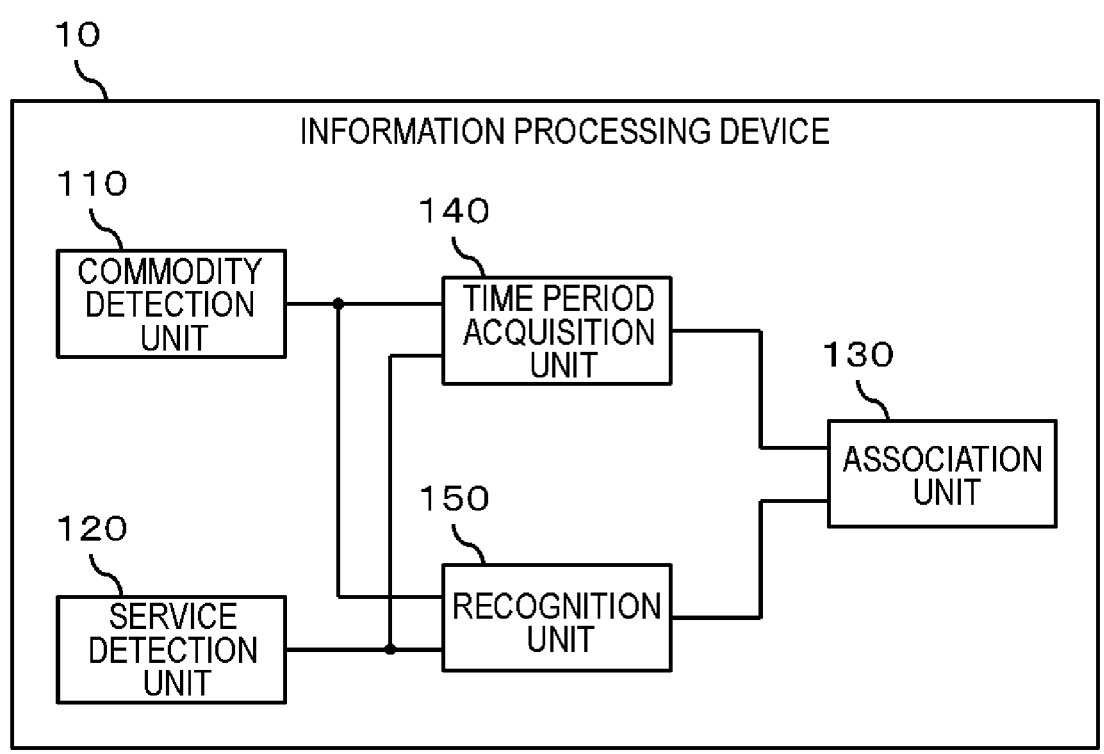
FIG. 1 is a schematic diagram showing a processing configuration of an information processing device in a first exemplary embodiment.

FIG. 1 is a schematic diagram showing a processing configuration of an information processing device in a first exemplary embodiment. As shown in FIG. 1, an information processing device 10 of the present exemplary embodiment includes a commodity detection unit 110, a service detection unit 120, an association unit 130, a time period acquisition unit 140, and a recognition unit 150.

The commodity detection unit 110 detects a commodity information symbol from a commodity label or the like. The wording "commodity label" as used herein refers to a member (seal or the like), showing a commodity information symbol, which is attached to a commodity, a packing material of a commodity, or the like, or refers to a region in which a commodity information symbol is printed in a commodity, a packing material of a commodity, or the like. The wording "commodity information symbol" as used herein refers to a form from which commodity information can be acquired, includes a one-dimensional code or a two-dimensional code having a commodity code encoded therein, a character string symbol (character string form) indicating commodity information, and the like. The wording "commodity information" as used herein refers to any information regarding a commodity such as the name, price, or commodity code of a commodity. The wording "commodity code" as used herein refers to commodity identification data, formed of characters, numbers, or signs, which is determined in advance in order to specify each commodity. A price look up (PLU) code (for example, a Japan article number (JAN) code or the like), a Non-PLU code, or the like may be used as the commodity code. In a case where a commodity code is a PLU code, commodity information is acquired with reference to a storage unit (not shown) that stores commodity information on the basis of the detected PLU code. In addition, in a case where a commodity code is a Non-PLU code, commodity information is acquired from the detected Non-PLU code. The wording "character string symbol indicating commodity information" as used herein refers to a symbol from which any commodity information is obtained by analyzing the symbol, and examples thereof include a character string indicating the name or price of a commodity which is written on a packing material of the commodity, a seal attached to a packing material, or the like. Meanwhile, the character string symbol indicating commodity information is not limited to these examples.

The commodity detection unit 110 analyzes an image obtained by capturing the appearance of a commodity by using, for example, a known image analysis algorithm or the like to thereby detect a commodity information symbol. In addition, the commodity detection unit 110 may detect reflected light of light emitted to a packing material of a commodity, or the like by using a light source and a light receiving element, and may detect a commodity information symbol on the basis of results of the detection.

In addition, in a case where the commodity detection unit 110 detects a new commodity information symbol (the present commodity information symbol) after a predetermined time period elapses from a timing when the previous commodity information symbol is detected, the commodity detection unit sets the new commodity information symbol as the next commodity information symbol. The "predetermined time period" as used herein is empirically or theoretically calculated on the basis of, for example, the actual commodity checkout operation, and set in the commodity detection unit 110 in advance. In addition, the "predetermined time period" may be a time period which is different for each operator. Thereby, it is possible to optimize a predetermined time period for each operator. In this case, a different "predetermined time period" is set in the information processing device 10 (POS terminal or the like), and the predetermined time period is changed over by the selection of an optimal time period by an operator, or the like. In addition, the optimal predetermined time period may be derived from learning results obtained by a learning unit (not shown) of the information processing device 10 on the basis of a processing time period which is actually required, or may be calculate using an average value, an intermediate value, and the like of processing time periods which are actually required. In addition, the commodity detection unit 110 may further discriminate between a "previous commodity information symbol" and a "next commodity information symbol" according to whether or not a commodity information symbol including different commodity information has been newly detected regardless of a time period. Hereinafter, the wording "detection of a commodity information symbol by the commodity detection unit 110" as used herein will refer to detections of commodity information symbols of different commodities among all detections of commodity information symbols which are performed by the commodity detection unit 110.

The service detection unit 120 detects a service information symbol from a service label. The wording "service label" as used herein refers to a member that displays a service information symbol attached to a commodity, a packing material of a commodity, or the like. The wording "service information symbol" as used herein refers to a form from which service information can be acquired, includes a one-dimensional code or a two-dimensional code having a service code encoded therein, a character string symbol (character string form) indicating service information, and the like. The wording "service information" as used herein refers to information indicating details of all services given to commodities. The service information includes price reduction information such as "20 yen price discount", discount information such as "30% discount", point extra information such as "five-times point providing", a service code that may specify each service, and the like. The wording "service code" as used herein refers to service identification data, formed of characters, numbers, signs, and the like, which is determined in advance in order to specify each service. The corresponding service information is acquired with reference to a storage unit (not shown) that stores information regarding each service on the basis of such a service code. The wording "character string symbol indicating service information" refers to a symbol from which any service information is obtained by the analysis thereof, and examples thereof include a character string, indicating a price reduction amount or a discount rate, which is written on a packing material of a commodity, a seal attached to a packing material of a commodity, or the like. Meanwhile, a character string symbol indicating service information is not limited to these examples.

The service detection unit 120 analyzes an image obtained by capturing the appearance of a commodity by using, for example, a known image analysis algorithm or the like to thereby detect a service information symbol. In addition, the service detection unit 120 may detect reflected light of light emitted to a packing material of a commodity, or the like by using a light source and a light receiving element, and may detect a service information symbol on the basis of results of the detection.

In addition, in a case where the service detection unit 120 detects a new service information symbol (the present service information symbol) after a predetermined time period elapses from a timing when the previous service information symbol is detected, the service detection unit sets the new service information symbol as the next service information symbol. The "predetermined time period" as used herein is empirically or theoretically calculated on the basis of, for example, an actual commodity checkout operation, similar to a case of the commodity detection unit 110, and is set in the service detection unit 120 in advance. In addition, the service detection unit 120 may further discriminate between "the previous service information symbol" and "the next service information symbol" regardless of a time period according to whether or not a service information symbol including different service information has been newly detected. Hereinafter, the wording "detection of a service information symbol by the service detection unit 120" as used herein will refer to detections of service information symbols of different commodities among all detections of service information symbols which are performed by the service detection unit 120.

In addition, the commodity detection unit 110 and the service detection unit 120 asynchronously perform processes in parallel. That is, regarding a commodity in which both a commodity information symbol and a service information symbol are present, a commodity information symbol may be detected earlier than a service information symbol, or a service information symbol may be detected earlier than a commodity information symbol.

The association unit 130 associates commodity information obtained using a commodity information symbol detected by the commodity detection unit 110 and service information obtained using a service information symbol detected by the service detection unit 120 with each other. An association process performed by the association unit 130 of the present exemplary embodiment is changed over to an association process using a time period between the detection of a commodity information symbol and the detection of a service information symbol and an association process that does not depend on the time period, in accordance with recognition results obtained by the recognition unit 150. Further, the association unit 130 outputs the commodity information and the service information which are associated with each other. Specifically, the association unit 130 outputs the commodity information and the service information which are associated with each other to a display device of the information processing device 10, or the like in order to display the associated pieces of information with respect to an operator of the information processing device 10. In addition, the association unit 130 may output the commodity information and the service information which are associated with each other to a storage unit of the information processing device 10 or another device in order to store the associated pieces of information as information which is usable later.

The recognition unit 150 recognizes that a commodity information symbol has been detected after a service information symbol having no prior candidate for association therewith is detected and recognizes that two service information symbols have been successively detected after a commodity information symbol having no prior candidate for association therewith is detected. In addition, the recognition unit 150 further recognizes that a service information symbol has been detected between detections of two successive commodity information symbols. Here, as described above, the "detection of a service information symbol" which is performed by the service detection unit 120 refers to detections of service information symbols of different commodities. That is, the "successive detection of two service information symbols" refers to the successive detection of two service information symbols treated as service information symbols of different commodities.

Here, the "candidate for association" is a service information symbol which is likely to be associated with a certain commodity information symbol, or a commodity information symbol which is likely to be associated with a certain service information symbol. A service information symbol which is detected before or after a certain commodity information symbol and not associated with another commodity information symbol is equivalent to a "candidate for association" with respect to a commodity information symbol. In addition, a commodity information symbol which is detected before or after a certain service information symbol and not associated with another service information symbol is equivalent to a "candidate for association" with respect to a service information symbol.

Accordingly, examples of the "commodity information symbol having no prior candidate for association therewith" include the following patterns. Specifically, a commodity information symbol which is first detected in a checkout operation for one customer, a commodity information symbol which is detected after a service information symbol which is previously associated therewith, or a commodity information symbol which is detected subsequently to a certain commodity information symbol being detected. In addition, examples of the "service information symbol having no prior candidate for association therewith" include the following patterns. Specifically, a service information symbol which is first detected in a checkout operation for one customer, a service information symbol which is detected after a commodity information symbol which is previously associated therewith, or a service information symbol which is detected subsequently to a certain service information symbol being detected.

As described above, the commodity detection unit 110 and the service detection unit 120 asynchronously operate in parallel. However, in a commodity checkout operation in a store, a commodity information symbol and a service information symbol are generally sequentially detected for each commodity. This is because an operator performing a commodity checkout operation in a store generally performs an operation of reading a commodity information symbol or a service information symbol for each commodity. For this reason, in a case where a commodity information symbol is detected immediately after a service information symbol having no prior candidate for association therewith, there is a high possibility that the service information symbol and the commodity information symbol are symbols related to the same commodity. In addition, in a case where two service information symbols are successively detected immediately after a commodity information symbol having no prior candidate for association therewith is detected, there is a high possibility that the commodity information symbol and the earlier detected service information symbol are symbols related to the same commodity. Consequently, the recognition unit 150 of the present exemplary embodiment recognizes these detection patterns as patterns (fixed patterns) which may fix association of a commodity information symbol and a service information symbol. In detail, a pattern in which a commodity information symbol is detected after a service information symbol having no prior candidate for association therewith is detected and a pattern in which two service information symbols are successively detected after a commodity information symbol having no prior candidate for association therewith is detected are fixed patterns.

On the other hand, in a case where a service information symbol is detected between the detections of two successive commodity information symbols, it is not possible to determine to which one of the two successive commodity information symbols the service information symbol is related, from the detected patterns. In this case, the recognition unit 150 of the present exemplary embodiment recognizes a pattern in which a service information symbol is detected between the detections of two successive commodity information symbols, as an unfixed pattern.

In the present exemplary embodiment, recognition results of the recognition unit 150 are notified to the association unit 130, and thus an association process performed by the association unit 130 is changed over. In detail, in a case where an unfixed pattern is recognized by the recognition unit 150, a notice of the recognition of the unfixed pattern is output to the association unit 130, and an association process using a time period is performed by the association unit 130. On the other hand, in a case where a fixed pattern is recognized by the recognition unit 150, a notice of the recognition of the fixed pattern is output to the association unit 130, and an association process that does not depend on a time period is performed by the association unit 130.

In a case where a service information symbol is detected between the detections of two successive commodity information symbols, the association unit 130 of the present exemplary embodiment performs an association process on the basis of detection intervals between the commodity information symbols and the service information symbol, as an association process using a time period. In detail, the association unit 130 acquires a time period from the detection of the earlier detected commodity information symbol (first commodity information symbol) to the detection of the service information symbol and a time period from the detection of the service information symbol to the detection of the later detected commodity information symbol (second commodity information symbol). The association unit 130 associates commodity information obtained using a commodity information symbol corresponding to the shorter time period out of the acquired two time periods with service information obtained using the service information symbol.

The association unit 130 of the present exemplary embodiment acquires information regarding a time period from the detection of the first commodity information symbol to the detection of the service information symbol and a time period from the detection of the service information symbol to the detection of the second commodity information symbol, from the time period acquisition unit 140. The association unit 130 determines a correspondence relationship between the service information symbol and the two successive commodity information symbols on the basis of the acquired time periods.

The time period acquisition unit 140 acquires a time period from the detection of the commodity information symbol (first commodity information symbol) to the detection of a service information symbol before the next commodity information symbol (second commodity information symbol) is detected. In addition, the time period acquisition unit 140 acquires a time period from the detection of the service information symbol to the detection of the second commodity information symbol. The time period acquisition unit 140 calculates a time period from the detection of the first commodity information symbol to the detection of the service information symbol and a time period from the detection of the service information symbol to the detection of the second commodity information symbol by using, for example, time information based on detection timings of the symbols. In addition, the time period acquisition unit 140 may start up or stop a timer in response to the detection of each symbol to acquire a time period from the detection of the first commodity information symbol to the detection of the service information symbol and a time period from the detection of the service information symbol to the detection of the second commodity information symbol.

In addition, in a case where a pattern (fixed pattern) allowing association of a commodity information symbol and a service information symbol to be fixed is recognized, the association unit 130 of the present exemplary embodiment performs an association process that does not depend on a time period. In detail, in a case where a fixed pattern is recognized, the association unit 130 associates commodity information and service information with each other by using a commodity information symbol and a service information symbol which are detected in the fixed pattern.

In addition, on the basis of a general commodity checkout operation, in a case where a commodity information symbol is further detected after a commodity information symbol having no prior candidate for association therewith is detected, it can be said that there is a high possibility that there is no service information symbol corresponding to the earlier detected commodity information symbol. Consequently, the recognition unit 150 may further recognize a pattern (pattern with no association) in which a commodity information symbol is further detected after a commodity information symbol having no prior candidate for association therewith is detected, and may notify the association unit 130 of the pattern. In a case where the association unit 130 receives the notice, the association unit specifies the absence of service information to be associated with commodity information obtained from the earlier detected commodity information symbol. The association unit 130 outputs the earlier detected commodity information symbol as a commodity information symbol having no association candidate to be associated therewith without associating the commodity information symbol with a service information symbol.

Figure 2:
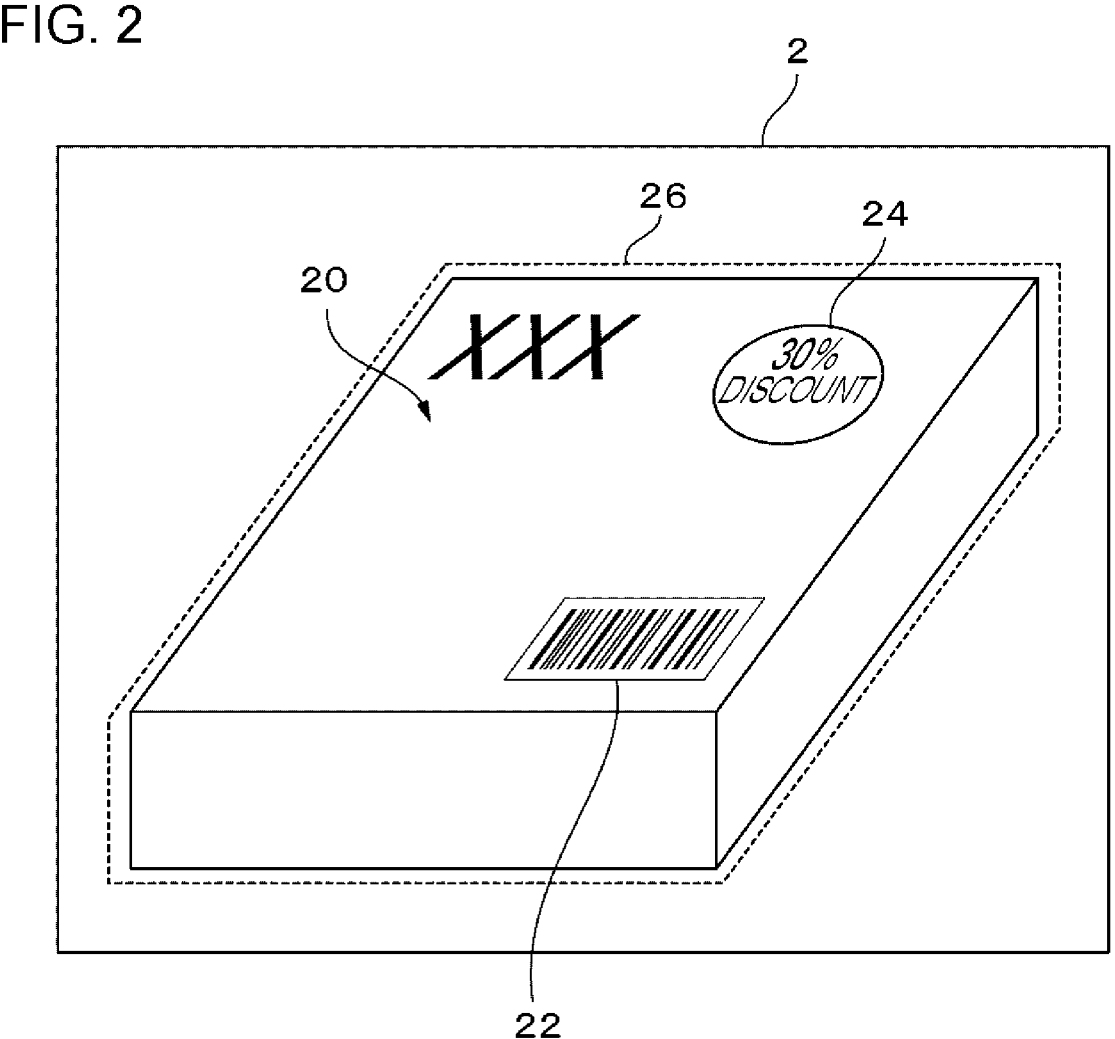
FIG. 2 is a diagram showing a commodity image obtained by capturing one commodity.

Here, a commodity information symbol detected by the commodity detection unit 110 and a service information symbol detected by the service detection unit 120 will be described with reference to FIG. 2. FIG. 2 is a diagram showing a commodity image 2 obtained by capturing one commodity 20. The commodity image 2 as shown in FIG. 2 is captured by an imaging unit not shown in the drawing. A bar code 22 and a price reduction seal 24 are attached to the commodity 20 seen in the commodity image 2 shown in the example of FIG. 2. The bar code 22 is a form of a commodity information symbol, and the price reduction seal 24 is a form of a service information symbol. The commodity detection unit 110 detects the bar code 22 in the commodity image 2 by using, for example, a known image processing algorithm or the like. Similarly, the service detection unit 120 also detects the price reduction seal 24 in the commodity image 2 by using a known image processing algorithm or the like. Here, a plurality of commodities 20 may be seen in one commodity image 2. In this case, as shown in FIG. 2, the commodity detection unit 110 and the service detection unit 120 specify commodity regions 26 indicating the commodities 20 from the commodity images 2, and detect bar codes 22 and price reduction seals 24 from the specified commodity regions 26. Meanwhile, in the example of FIG. 2, the commodity region 26 indicates a region in which the entire commodity 20 is seen. However, the invention is not limited thereto, and the commodity region may be a region in which a portion of the commodity 20 is seen.

In this manner, the commodity detection unit 110 may be referred to as a first detection unit that detects a first sign may show information (first information) belonging to a first type from a certain image. In addition, the service detection unit 120 may be referred to as a second detection unit that detects a second sign may show information (second information) belonging to a second type different from the first type. In this case, the association unit 130 associates first information (for example, commodity information) which is obtained using a first sign corresponding to a shorter time period out of a "time period from detection of a first sign to detection of a second sign" and a "time period from the detection of the second sign to detection of a later first sign, with second information (for example, service information) which is obtained using the second sign. The association unit 130 may also be referred to as an output unit by further outputting the first information and the second information which are associated with each other.

[Hardware Configuration]

Figure 3:
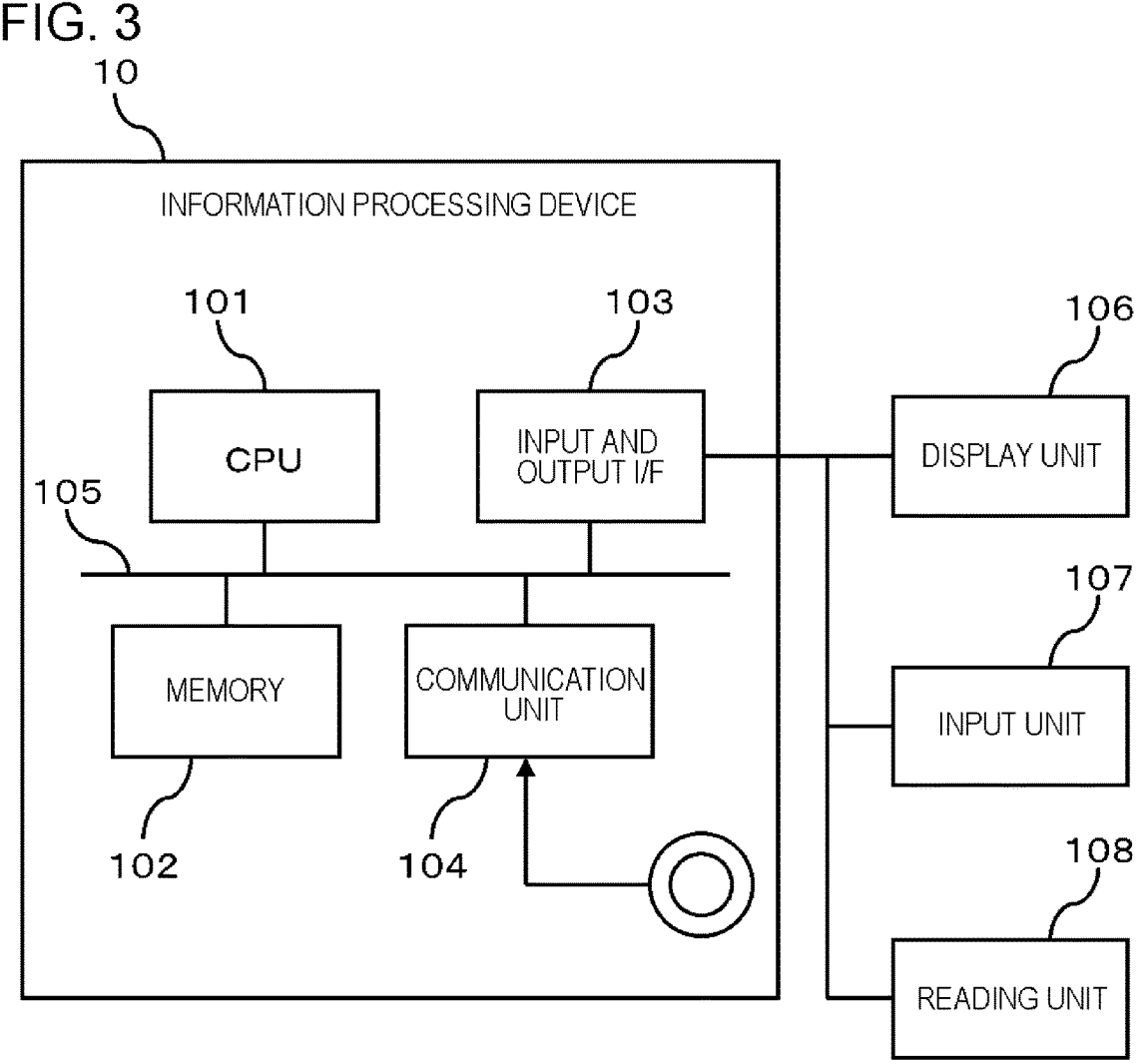
FIG. 3 is a schematic diagram showing an example of a hardware configuration of the information processing device in the first exemplary embodiment.

FIG. 3 is a schematic diagram showing an example of a hardware configuration of the information processing device in the first exemplary embodiment. As shown in FIG. 3, the information processing device includes a central processing unit (CPU) 101, a memory 102, an input and output interface (I/F) 103, a communication unit 104, and the like. The CPU 101 is connected to other units through a communication line such as a bus 105. The memory 102 is a random access memory (RAM), a read only memory (ROM), a flash memory, or the like. The communication unit 104 transmits and receives a signal to and from other devices or apparatuses. A portable recording medium and the like may also be connected to the communication unit 104. The input and output I/F 103 is connected to a display unit 106, an input unit 107, the reading unit 108, and the like.

The display unit 106 is a unit that displays a screen, such as a liquid crystal display (LCD) or a cathode ray tube (CRT) display, which corresponds to drawing data which is processed by the CPU 101, a graphics processing unit (GPU) (not shown), or the like. The input unit 107 is a unit that receives a user's operation input, and is configured as, for example, a hardware button unit, a touch sensor, or the like. The display unit 106 and the input unit 107 may be integrally formed to be realized as a touch panel. The reading unit 108 is a camera which is constituted by a lens, an imaging element, and the like, and captures a still image and a moving image. In addition, the reading unit 108 may be a symbol reading device, such as a bar code reader, which is constituted by a light source, a light receiving element, and the like. The commodity detection unit 110 and the service detection unit 120 which are mentioned above detect a commodity information symbol and a service information symbol by using information acquired from the reading unit 108.

A hardware configuration of the information processing device 10 is not limited to a configuration shown in FIG. 3. The information processing device 10 may further include a component other than components shown in FIG. 3. In addition, the information processing device 10 may not include the display unit 106, the input unit 107, and the reading unit 108. In this case, the information processing device 10 communicates with another external device through the communication unit 104 to display drawing data on a display unit of another device, to receive a user's input operation through an input unit of another device, and to acquire information read by a reading unit of another device.

The above-described processing units (the commodity detection unit 110, the service detection unit 120, the association unit 130, the time period acquisition unit 140, and the recognition unit 150) of the information processing device 10 are realized, for example, by the execution of programs stored in the memory 102 by the CPU 101. The programs are installed from a portable recording medium, such as a compact disc (CD) or a memory card, or another computer on a network through the communication unit 104 or the like, and are stored in the memory 102. The CPU 101 executes programs, stored in the memory 102, for implementing functions of the commodity detection unit 110, the service detection unit 120, the association unit 130, the time period acquisition unit 140, and the recognition unit 150, and thus the commodity detection unit 110, the service detection unit 120, the association unit 130, the time period acquisition unit 140, and the recognition unit 150 are realized.

Operational Example

Figure 4:
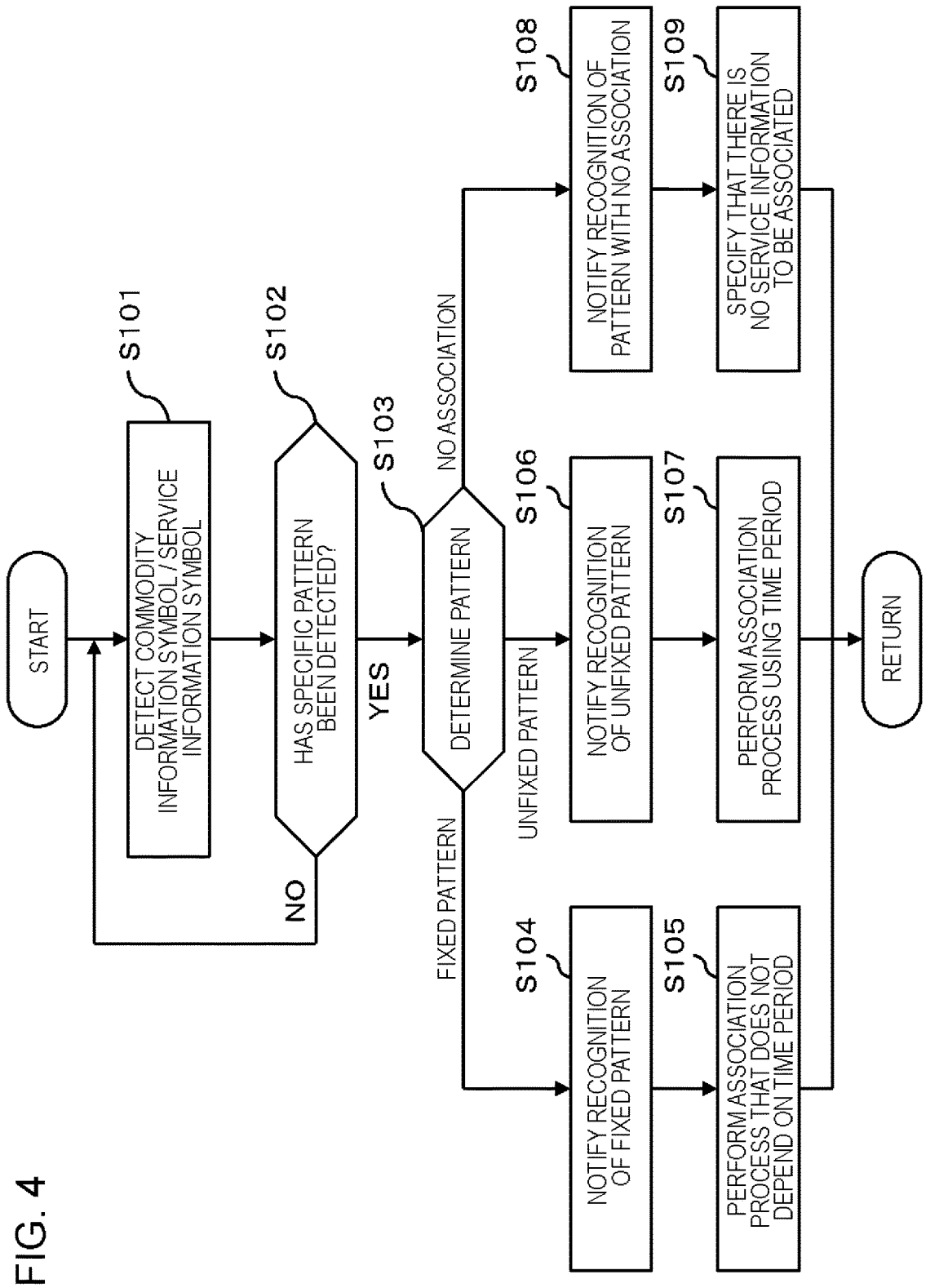
FIG. 4 is a flow chart showing a flow of processing of the information processing device in the first exemplary embodiment.
Figure 5:
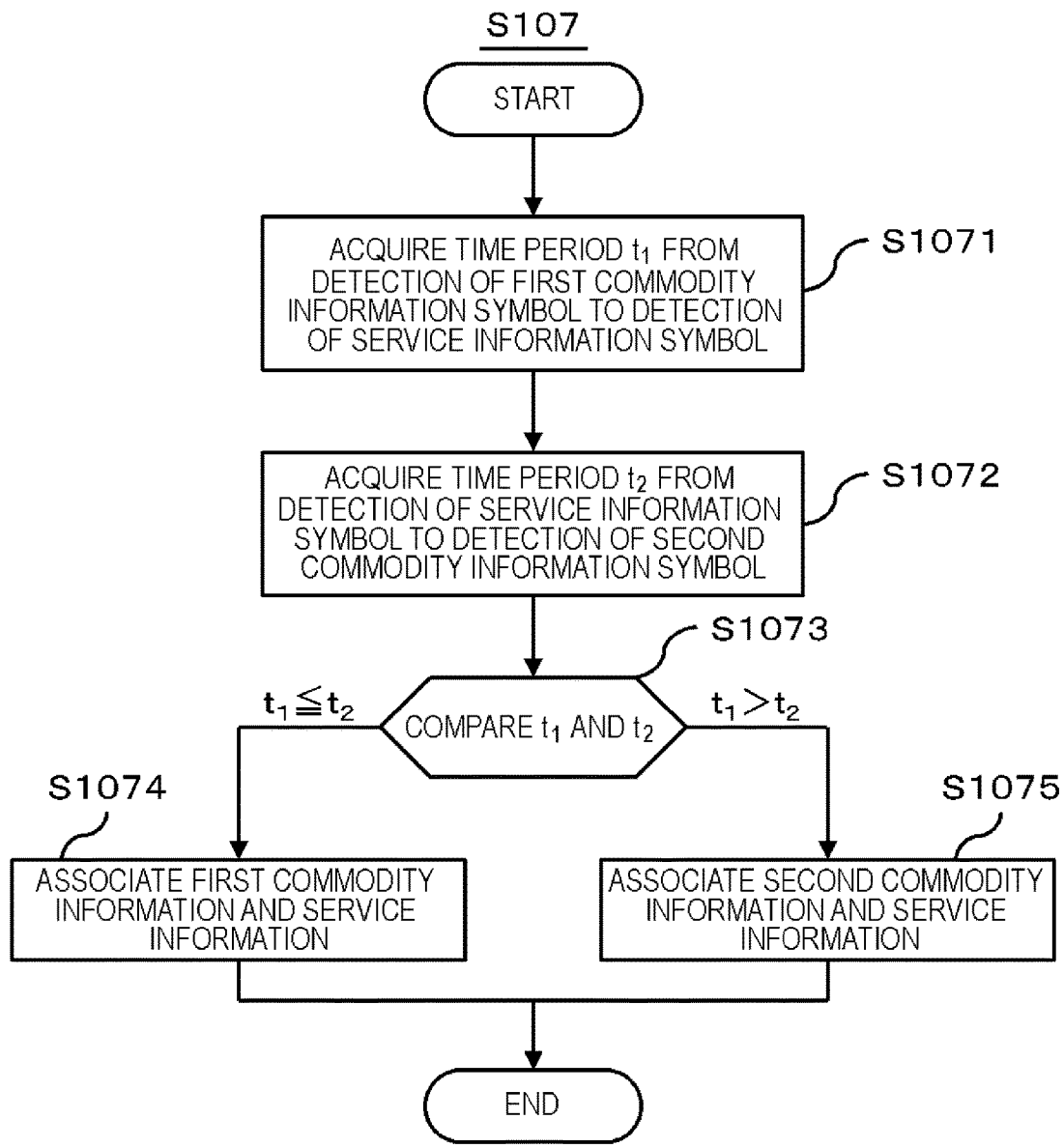
FIG. 5 is a flow chart showing a flow of an association process using a time period.

An operational example of the information processing device in the present exemplary embodiment will be described with reference to FIGS. 4 and 5. FIG. 4 is a flow chart showing a flow of processing of the information processing device in the first exemplary embodiment. FIG. 5 is a flow chart showing a flow of an association process using a time period.

A commodity information symbol and a service information symbol are detected by the commodity detection unit 110 and the service detection unit 120 (S101). As described above, the commodity information symbol and the service information symbol are asynchronously detected in parallel. The recognition unit 150 monitors the commodity information symbol and the service information symbol which are detected in S101, and recognizes that a specific pattern has been detected (S102). Here, the "specific pattern" is classified into a "fixed pattern", an "unfixed pattern", and a "pattern with no association". The "fixed pattern" is a pattern in which a commodity information symbol is detected after a service information symbol having no prior candidate for association therewith is detected, and a pattern in which two service information symbols are successively detected after a commodity information symbol having no prior candidate for association therewith is detected. The "unfixed pattern" is a pattern in which a service information symbol is detected between detections of two successive commodity information symbols. The "pattern with no association" is a pattern in which a commodity information symbol is further detected after a commodity information symbol having no prior candidate for association therewith is detected. In a case where a specific pattern is not recognized (S102: NO), a commodity information symbol and a service information symbol are further detected by the commodity detection unit 110 and the service detection unit 120 (S101). In a case where a specific pattern is recognized (S102: YES), the recognition unit 150 determines to which of a "fixed pattern", an "unfixed pattern", and a "pattern with no association" the recognized pattern corresponds (S103).

In a case where the determination result is a "fixed pattern" (S103: fixed pattern), the recognition unit 150 notifies the association unit 130 of the recognition of the fixed pattern (S104). The association unit 130 having received the notice in S104 performs an association process that does not depend on a time period (S105). In detail, the association unit 130 acquires commodity information and service information by using a commodity information symbol and a service information symbol which are included in the fixed pattern, and associates the acquired commodity information and service information with each other.

In a case where the determination result is an "unfixed pattern" (S103: unfixed pattern), the recognition unit 150 notifies the association unit 130 of the recognition of the unfixed pattern (S106). The association unit 130 having received the notice in S106 performs an association process using a time period (S107). The association process using a time period will be described with reference to FIG. 5.

The association unit 130 acquires a time period $t_1$ from the detection of the earlier commodity information symbol (first commodity information symbol) to the detection of a service information symbol from the time period acquisition unit 140 (S1071). In addition, the association unit 130 acquires a time period $t_2$ from the detection of the service information symbol to the detection of the later commodity information symbol (second commodity information symbol) from the time period acquisition unit 140 (S1072). The association unit 130 compares the time period $t_1$ and the time period $t_2$ with each other (S1073). In a case where the time period $t_1$ is equal to or less than the time period $t_2$ (S1073: $t_1 \leq t_2$), the association unit 130 associates commodity information (first commodity information) which is obtained using the first commodity information symbol and service information obtained using the service information symbol with each other (S1074). On the other hand, in a case where the time period $t_1$ is longer than the time period $t_2$ (S1073: $t_1 > t_2$), the association unit 130 associates commodity information (second commodity information) which is obtained using the second commodity information symbol and service information obtained using the service information symbol with each other (S1075). Meanwhile, in FIG. 4, in a case where the time period $t_1$ and the time period $t_2$ have the same length, the first commodity information and the service information are associated with each other. However, the invention is not limited thereto, and the second commodity information and the service information may be associated with each other. In addition, in a case where association is performed, it is preferable that an operator can ascertain to which commodity information symbol the service information symbol corresponds. For example, the information processing device 10 may further include an output unit (not shown) that notifies which service information symbol corresponds to which commodity information symbol by different outputs. Specifically, the output unit is configured to output a first sound or first display information in accordance with the detection of each symbol and then, in a case where an association process is performed in accordance with the detection of each symbol, to output a second sound or second display information which is different from the first sound or the first display information. In addition, the output unit may be configured to output a sound or display information only in a case where an association process is performed. In this manner, an operator can easily determine with which commodity information symbol a service information symbol is associated.

In a case where the determination result is a "pattern with no association" (S103: no association), the recognition unit 150 notifies the association unit 130 of the recognition of the pattern with no association (S108). The association unit 130 having received the notice in S108 specifies that there is no service information to be associated with commodity information obtained from a commodity information symbol which is earlier detected (S109), and performs an output without performing association with a service information symbol.

As described above, in the present exemplary embodiment, in a case where service information is detected between the detections of two successive commodity information symbols, the service information is automatically associated with a commodity information symbol, which is temporally near, out of the two successive commodity information symbols. Here, on the basis of a commodity checkout operation, in a case where service information is detected between the detections of the two successive commodity information symbols, there is a high possibility that the service information symbol is detected at a timing close to a detection timing of the corresponding commodity information symbol. Therefore, according to the present exemplary embodiment, it is possible to correctly associate commodity information and service information with each other.

In addition, according to the present exemplary embodiment, an operation of associating commodity information and service information with each other by an operator of the information processing device 10 is not required, and thus it is possible to expect an effect of improving usability. Further, an operator's operation is not required, and thus it is possible to reduce a time required for an input operation or a time required for an input operation to be performed again due to an operation error. As a result, it is also possible to expect an effect of reducing a time required for a checkout operation.

In addition, in the present exemplary embodiment, it is determined whether a correspondence relationship between a commodity information symbol and a service information symbol, which are detected, can be fixed, on the basis of detection patterns of the commodity information symbol and the service information symbol. In a case where a pattern allowing the correspondence relationship to be fixed is detected, commodity information obtained using the commodity information symbol and service information obtained using the service information symbol are automatically associated with each other. Thereby, according to the present exemplary embodiment, it is possible to correctly associate the commodity information and the service information with each other on the basis of the fixed pattern. In addition, according to the present exemplary embodiment, the operation of an operator of the information processing device 10 is not required, and thus it is possible to expect an effect of improving usability. Further, in this case, the correspondence relationship can be immediately fixed without depending on a time period, and thus it is also possible to expect an effect of further reducing a time required for a checkout operation.

In addition, in the present exemplary embodiment, in a case where a commodity information symbol is further detected after a commodity information symbol having no prior candidate for association therewith is detected, the earlier detected commodity information symbol is specified as a symbol having no service information symbol corresponding thereto. Thereby, the number of patterns in which a correspondence relationship between the commodity information symbol and the service information symbol can be fixed is increased, and thus it is possible to expect an effect related to the above-mentioned usability and time required for a checkout operation.

Second Exemplary Embodiment

As solving means of the above-described problems, an information processing device 10 may include at least a commodity detection unit 110, a service detection unit 120, and an association unit 130 without being limited to the configuration of the first exemplary embodiment. The processing units (the commodity detection unit 110, the service detection unit 120, and the association unit 130) of the information processing device 10 are realized by a CPU 101 executing programs for implementing functions of the processing units, similar to the first exemplary embodiment.

[Processing Configuration]

Figure 6:
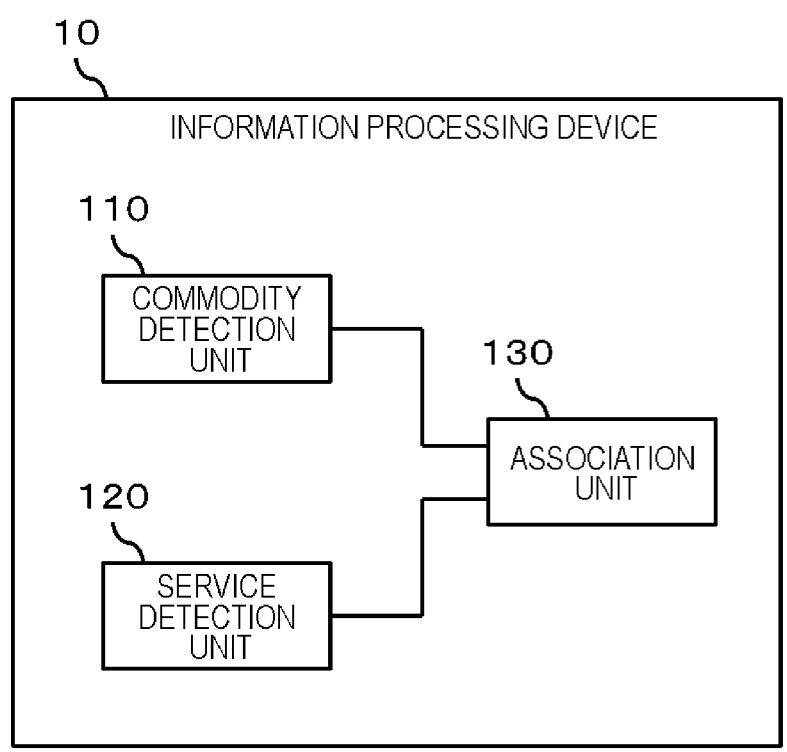
FIG. 6 is a schematic diagram showing a processing configuration of an information processing device in a second exemplary embodiment.

FIG. 6 is a schematic diagram showing a processing configuration of an information processing device in a second exemplary embodiment. As shown in FIG. 6, an information processing device 10 of the second exemplary embodiment includes a commodity detection unit 110, a service detection unit 120, and an association unit 130.

The commodity detection unit 110 detects a commodity information symbol, and the service detection unit 120 detects a service information symbol. The operations of the commodity detection unit 110 and the service detection unit 120 are the same as those in the first exemplary embodiment, and thus a detailed description thereof will not be repeated.

In a case where a service information symbol is detected between the detections of two successive commodity information symbols, the association unit 130 of the present exemplary embodiment performs an association process on the basis of a detection interval between the commodity information symbol and the service information symbol. In detail, the association unit 130 acquires a time period from the detection of the earlier commodity information symbol (first commodity information symbol) to the detection of the service information symbol and a time period from the detection of the service information symbol and the detection of the later commodity information symbol (second commodity information symbol). The association unit 130 associates commodity information obtained using a commodity information symbol corresponding to the shorter time period out of the acquired two time periods and service information obtained using the service information symbol with each other.

OPERATIONAL EXAMPLE

Figure 7:
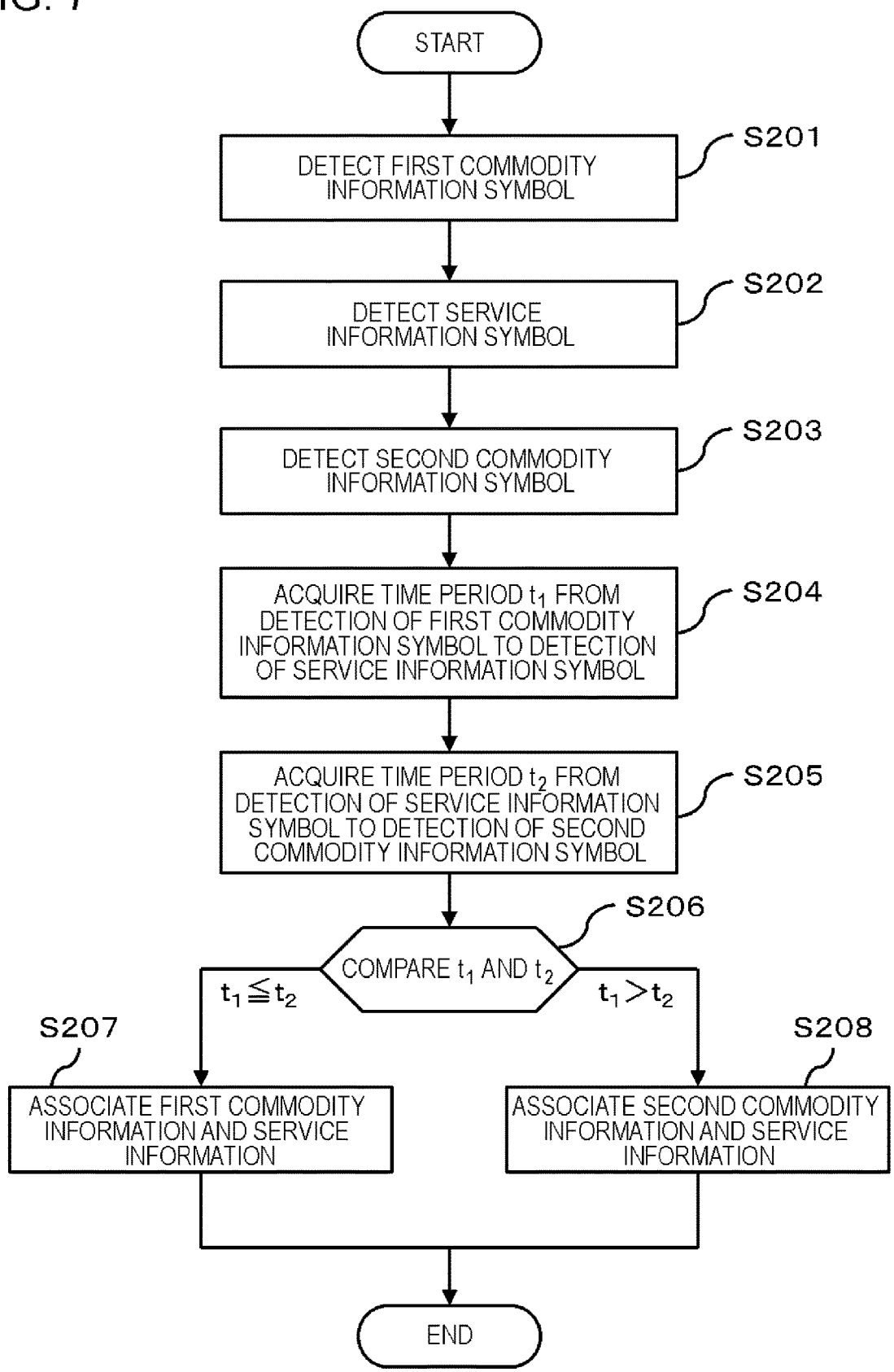
FIG. 7 is a flow chart showing a flow of a process of the information processing device in the second exemplary embodiment.

An operational example of the information processing device in the present exemplary embodiment will be described with reference to FIG. 7. FIG. 7 is a flow chart showing a flow of a process of the information processing device in the second exemplary embodiment.

As described above, a commodity information symbol and a service information symbol are asynchronously detected in parallel. First, the commodity detection unit 110 detects a first commodity information symbol (S201). It is assumed that next, the service detection unit 120 detects a service information symbol (S202), and the commodity detection unit 110 detects a second commodity information symbol (S203).

In a case where the commodity information symbol and the service information symbol are detected in this order, the association unit 130 acquires a time period $t_1$ from the detection of the first commodity information symbol to the detection of the service information symbol (S204). In addition, the association unit 130 acquires a time period $t_2$ from the detection of the service information symbol to the detection of the second commodity information symbol (S205). The association unit 130 compares the detection interval $t_1$ and the detection interval $t_2$ with each other (S206). The association unit 130 may calculate the time period $t_1$ and the time period $t_2$ by using time information based on timings when the symbols are detected in S201 to S203, and may start up or stop a timer in response to the detection of the symbols to acquire the time period $t_1$ and the time period $t_2$. In a case where the time period $t_1$ is equal to or less than the time period $t_2$ (S206: $t_1 t_2$), the association unit 130 associates commodity information (first commodity information) which is obtained using the first commodity information symbol and service information obtained using the service information symbol with each other (S208). (S207). On the other hand, in a case where the time period $t_1$ is longer than the time period $t_2$ (S206: $t_1 > t_2$), the association unit 130 associates commodity information (second commodity information) which is obtained using the second commodity information symbol and service information obtained using the service information symbol with each other (S208). Meanwhile, in FIG. 7, in a case where the time period t1 and the time period t2 have the same length, the first commodity information and the service information are associated with each other. However, the invention is not limited thereto, and the second commodity information and the service information may be associated with each other.

As described above, in the present exemplary embodiment, in a case where service information is detected between the detections of two successive commodity information symbols, the service information is automatically associated with a commodity information symbol, which is temporally near, out of the two successive commodity information symbols. Here, on the basis of a commodity checkout operation, in a case where service information is detected between the detections of the two successive commodity information symbols, the service information symbol is often detected at a timing close to a detection timing of the corresponding commodity information symbol. Therefore, according to the present exemplary embodiment, it is possible to correctly associate commodity information and service information with each other.

In addition, according to the present exemplary embodiment, a pattern may be included in which an operation of associating commodity information and service information with each other by an operator of the information processing device 10 is not required in a checkout operation. Thereby, it is possible to expect an effect of improving usability and an effect of reducing a time required for one checkout operation.

Hereinafter, the above-described exemplary embodiments will be described in more detail with reference to a plurality of examples. The invention is not restricted by the following examples.

Example 1

Figure 8:
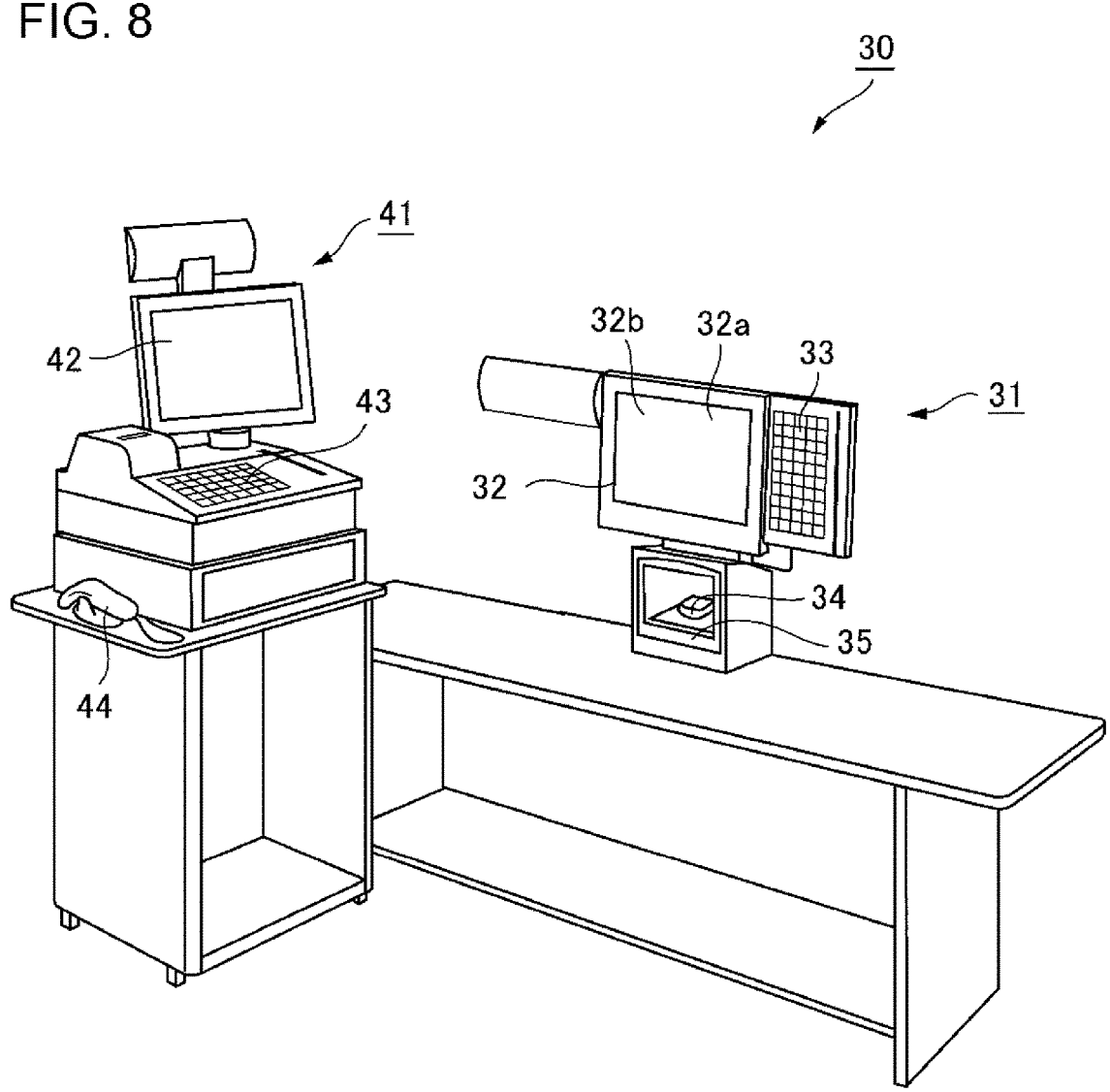
FIG. 8 is a diagram showing an example of a configuration of a POS register device.

FIG. 8 is a diagram showing an example of a configuration of a POS register device. As shown in FIG. 8, Example 1 shows an example in which the information processing device 10 and the information processing method which are described above are applied to a point of sale (POS) register device 30. The POS register device 30 in Example 1 includes a checker device 31 and a cashier device 41. The checker device 31 registers a commodity in an object to be checked out, and transmits information regarding a commodity to be checked out to the cashier device 41. The cashier device 41 performs a settlement process of a commodity to be checked out. The commodity to be checked out may be registered by both the checker device 31 and the cashier device 41.

The checker device 31 and the cashier device 41 in Example 1 includes a CPU 101, a memory 102, an input and output I/F 103, a communication unit 104, and the like, similar to FIG. 3. The information processing device 10 mentioned above may be applied to both the checker device 31 and the cashier device 41, and the above-described information processing method may be performed by both the checker device 31 and the cashier device 41.

The display unit 106 mentioned above is equivalent to at least one of a display unit 32a of a touch panel unit 32 and a display unit 42. The input unit 107 mentioned above is equivalent to at least one among a touch panel 32b of the touch panel unit 32, a keyboard 33, and a keyboard 43. The reading unit 108 mentioned above is equivalent to a scanner device 34 and a scanner device 44. The scanner device 34 captures a commodity image in which the appearance of a commodity held over a reading window 35 is seen. A commodity information symbol or a service information symbol is detected by processing an image captured by the scanner device 34, and thus it is possible to acquire commodity information or service information. The scanner device 44 includes a light source and a light receiving element, and detects a commodity information symbol or a service information symbol on the basis of results of detection of reflected light of light emitted to a packing material of a commodity, or the like. The commodity information or the service information may be acquired using the commodity information symbol or the service information symbol which is detected by the scanner device 44.

According to Example 1, it is possible to correctly associate commodity information and service information with each other in accordance with detection timings or detection patterns of a commodity information symbol and a service information symbol by the scanner device 34 or the scanner device 44. In addition, an operator of the POS register device 30 does not need to input a correspondence relationship between a commodity and service information regarding the commodity. As a result, it is possible to expect an effect of improving usability and an effect of reducing a time required for a commodity checkout operation.

In Example 1, a description has been given of an example in which the POS register device 30 includes the checker device 31 and the cashier device 41, but the POS register device 30 may be constituted by only the cashier device 41.

Example 2

Figure 9:
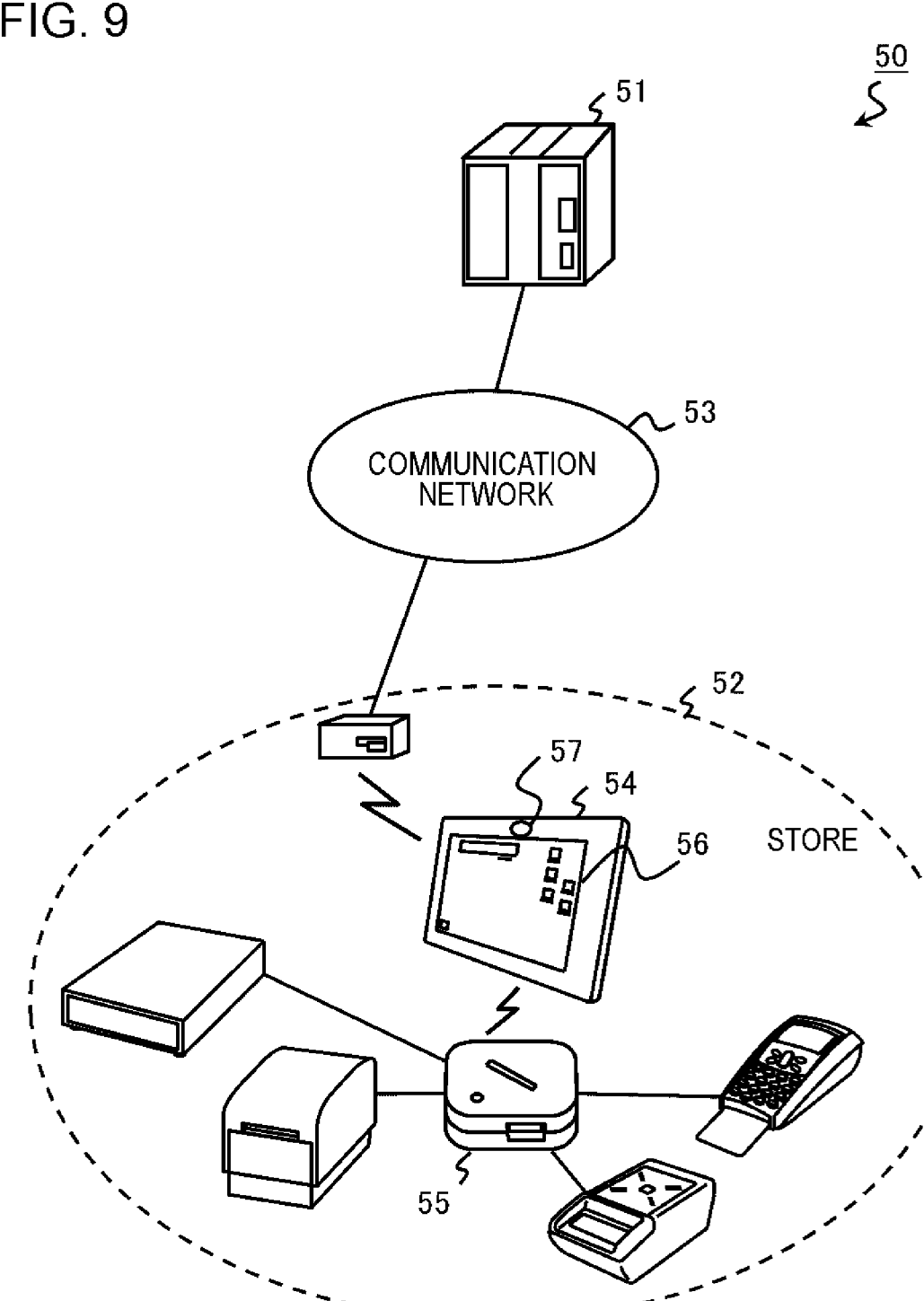
FIG. 9 is a diagram showing an example of a configuration of a POS system.

FIG. 9 is a diagram showing an example of a configuration of a POS system. As shown in FIG. 9, Example 2 shows an example in which the information processing device 10 and the method of presenting a commodity image which are described above are applied to a POS system 50. The POS system 50 in Example 2 includes a server device 51 and a store side configuration 52, and the server device 51 and the store side configuration 52 are communicably connected to each other by a communication network 53. The store side configuration 52 includes a store terminal 54, a stand 55, and the like which are connectable to the communication network 53 through a communication relay device. The stand 55 is an apparatus for communicably connecting the store terminal 54 and another apparatus (a handy scanner, a cash drawer, a receipt printer, or the like).

The store terminal 54 is a general-purpose computer such as a personal computer (PC), a notebook PC, a tablet type terminal, or a smart phone, and transmits and receives data to and from the server device 51 to thereby realize the same function as that of the POS register device 30 mentioned above. The store terminal 54 includes a touch panel unit 56, an imaging unit 57, and the like. The display unit 106 mentioned above is equivalent to a display unit of the touch panel unit 56. The input unit 107 mentioned above is equivalent to a touch panel of the touch panel unit 56. The reading unit 108 mentioned above is equivalent to the imaging unit 57.

The server device 51 is a general server computer, and is configured as a WEB server, an application server, or the like. The store terminal 54 and the server device 51 include a CPU 101, a memory 102, an input and output I/F 103, a communication unit 104, and the like, similar to FIG. 3.

The information processing device 10 mentioned above may be configured as only the server device 51, only the store terminal 54, or both of them. Similarly, the above-described information processing method may be performed by only the server device 51, only the store terminal 54, or both of them. For example, in a case where a WEB system is used as an interface between the server device 51 and the store terminal 54, the above-described processing units are realized by the server device 51, and the store terminal 54 may operate as a simple display unit. On the contrary, all of the processing units may be realized in the store terminal 54. In addition, some of the processing units may be realized by the server device 51, and the remaining processing units may be realized by the store terminal 54. For example, the association unit 130 may be realized by the server device 51, and the other processing units may be realized by the store terminal 54.

According to Example 2, an operator of the store terminal 54 can correctly associate commodity information and service information with each other in accordance with detection timings or detection patterns of a commodity information symbol and a service information symbol by a scanner device connected to the imaging unit 57 or the stand 55. In addition, an operator of the store terminal 54 does not need to input a correspondence relationship between a commodity and service information regarding the commodity. As a result, it is possible to expect an effect of improving usability and an effect of reducing a time required for a commodity checkout operation.

Example 3

The information processing device 10 and the information processing method which are described above can be applied not only to the POS register device and the POS system 50 but also to all devices assisting the determination of a commodity. For example, the information processing device 10 and the information processing method which are described above may be applied to a general-purpose computer, such as a PC or a smart device, which is used by general users.

In this manner, the invention does not exclude the information processing device being realized by a plurality of devices (a housing including a plurality of computers or a plurality of CPUs). In addition, the above-described exemplary embodiments may be combined with each other within a range in which the contents thereof do not conflict with each other.

Although the exemplary embodiments of the invention have been described above with reference to the accompanying drawings, these are merely illustrative of the invention, and various other configurations may also be adopted.

In addition, in the plurality of flow charts used in the above description, a plurality of steps (processes) are described in order. However, the order of execution of the processes performed in the exemplary embodiments is not limited to the described order. In the exemplary embodiments, the order of the steps shown in the drawings can be changed within a range in which any trouble does not occur in terms of contents.

Hereinafter, an example of a reference configuration will be appended.

1. An information processing device including:
a commodity detection unit that detects a commodity information symbol;
a service detection unit that detects a service information symbol; and
an association unit that associates commodity information obtained using a commodity information symbol corresponding to a shorter time period, out of a time period from detection of a commodity information symbol to detection of a service information symbol and a time period from the detection of the service information symbol to detection of a commodity information symbol, with service information obtained using the service information symbol.

2. The information processing device according to 1,
wherein the association unit associates commodity information and service information with each other without depending on the time period by using a commodity information symbol and a service information symbol which are successively detected, in a case where a commodity information symbol is detected after a service information symbol having no prior candidate for association therewith is detected and in a case where two service information symbols are successively detected after a commodity information symbol having no prior candidate for association therewith is detected.

3. The information processing device according to 1 or 2, further including:
a time period acquisition unit that acquires a time period from detection of a commodity information symbol to detection of a service information symbol before a next commodity information symbol is detected and a time period from the detection of the service information symbol to the detection of the next commodity information symbol.

4. The information processing device according to 3,
wherein in a case where symbols are detected in order of a first commodity information symbol, a service information symbol, and a second commodity information symbol, the time period acquisition unit acquires a first time period from the detection of the first commodity information symbol to the detection of the service information symbol and a second time period from the detection of the service information symbol to the detection of the second commodity information symbol, and the association unit determines a commodity information symbol to be associated with the service information on the basis of results of comparison between a length of the first time period and a length of the second time period.

5. The information processing device according to any one of 2 to 4, further including:
a recognition unit that recognizes that a commodity information symbol has been detected after a service information symbol having no prior candidate for association therewith is detected and that two service information symbols have been successively detected after a commodity information symbol having no prior candidate for association therewith is detected,
wherein a process performed by the association unit is changed over to an association process using a time period between the detection of the commodity information symbol and the detection of the service information symbol and an association process that does not depend on the time period, in accordance with the recognition of the recognition unit.

6. The information processing device according to any one of 1 to 5,
wherein the association unit further specifies, in a case where a commodity information symbol is further detected after a commodity information symbol having no prior candidate for association therewith is detected, that there is no service information to be associated with commodity information obtained from the earlier detected commodity information symbol.

7. An information processing device including:
a first detection unit that detects a first sign from an image;
a second detection unit that detects a second sign from an image; and
an output unit that outputs commodity information obtained using a first sign corresponding to a shorter time period, out of a time period from detection of a first sign to detection of a second sign and a time period from the detection of the second sign to detection of a later first sign, and service information obtained using the second sign in association with each other.

8. An information processing method performed by at least one computer, the method including:
detecting a commodity information symbol;
detecting a service information symbol; and
associating commodity information obtained using a commodity information symbol corresponding to a shorter time period, out of a time period from detection of a commodity information symbol to detection of a service information symbol and a time period from the detection of the service information symbol to detection of a commodity information symbol, with service information obtained using the service information symbol.

9. The information processing method according to 8,
wherein the computer associates commodity information and service information with each other without depending on the time period by using a commodity information symbol and a service information symbol which are successively detected, in a case where a commodity information symbol is detected after a service information symbol having no prior candidate for association therewith is detected and in a case where two service information symbols are successively detected after a commodity information symbol having no prior candidate for association therewith is detected.

10. The information processing method according to 8 or 9, further including:

causing the computer to acquire a time period from detection of a commodity information symbol to detection of a service information symbol before a next commodity information symbol is detected and a time period from the detection of the service information symbol to the detection of the next commodity information symbol.

11. The information processing method according to 10, wherein in a case where symbols are detected in order of a first commodity information symbol, a service information symbol, and a second commodity information symbol, the computer acquires a first time period from the detection of the first commodity information symbol to the detection of the service information symbol and a second time period from the detection of the service information symbol to the detection of the second commodity information symbol, and determines a commodity information symbol to be associated with the service information on the basis of results of comparison between a length of the first time period and a length of the second time period.

12. The information processing method according to any one of 9 to 11,
wherein the computer recognizes that a commodity information symbol has been detected after a service information symbol having no prior candidate for association therewith is detected and that two service information symbols have been successively detected after a commodity information symbol having no prior candidate for association therewith is detected, and wherein a process of associating the commodity information and the service information with each other is changed over to an association process using a time period between the detection of the commodity information symbol and the detection of the service information symbol and an association process that does not depend on the time period, in accordance with results of the recognition.

13. The information processing method according to any one of 8 to 12, further including:
causing the computer, in a case where a commodity information symbol is further detected after a commodity information symbol having no prior candidate for association therewith is detected, to specify that there is no service information to be associated with commodity information obtained from the earlier detected commodity information symbol.

14. A program causing at least one computer to perform the information processing method according to any one of 8 to 13.

The application is based on Japanese Patent Application No. 2016-136165 filed on Jul. 1, 2014, the content of which is incorporated herein by reference.

What is claimed is:

1. An information processing device comprising to:
a processor;
a memory storing code that the processor executes to:
detect a commodity information symbol;
detect a service information symbol;
recognize that a commodity information symbol has been detected after service information symbol having no prior candidate for association therewith is detected and that two service information symbols have been continuously detected after a commodity information symbol having no prior candidate for association therewith is detected; and
associate commodity information obtained using a commodity information symbol corresponding to a shorter time period, out of a time period from detection of a commodity information symbol to detection of a service information symbol and a time period from the detection of the service information symbol to detection of a commodity information symbol, with service information obtained using the service information symbol,
wherein the processor is changed over to an association process using a time period between the detection of the commodity information symbol and the detection of the service information symbol and an association process that does not depend on any time period, in accordance with the recognition by the processor,
wherein the processor associates commodity information and service information with each other without depending on any time period by using a commodity information symbol and a service information symbol which are successively detected, in a case where a commodity information symbol is detected after a service information symbol having no prior candidate for association therewith is detected and in a case where two service information symbols are successively detected after a commodity information symbol having no prior candidate for association therewith is detected.

2. The information processing device according to claim 1, wherein the processor executes the code to further:
acquire a time period from detection of a commodity information symbol to detection of a service information symbol before a next commodity information symbol is detected and a time period from the detection of the service information symbol to the detection of the next commodity information symbol.

3. The information processing device according to claim 2,
wherein in a case where symbols are detected in order of a first commodity information symbol, a service information symbol, and a second commodity information symbol, the processor acquires a first time period from the detection of the first commodity information symbol to the detection of the service information symbol and a second time period from the detection of the service information symbol to the detection of the second commodity information symbol, and the processor determines a commodity information symbol to be associated with the service information on the basis of results of comparison between a length of the first time period and a length of the second time period.

4. The information processing device according to claim 1,
wherein the processor further specifies, in a case where a commodity information symbol is further detected after a commodity information symbol having no prior candidate for association therewith is detected, that there is no service information to be associated with commodity information obtained from the earlier detected commodity information symbol.

5. An information processing method performed by at least one computer, the method comprising:
detecting a commodity information symbol;
detecting a service information symbol;
recognize that a commodity information symbol has been detected after service information symbol having no prior candidate for association therewith is detected and that two service information symbols have been continuously detected after a commodity information symbol having no prior candidate for association therewith is detected; and
associating, in a case where the service information symbol is detected between the detections of the two successive commodity information symbols, commodity information obtained using a commodity information symbol corresponding to a shorter time period, out of a time period from the detection of the earlier commodity information symbol to the detection of the service information symbol and a time period from the detection of the service information symbol and the detection of the later commodity information symbol, with service information obtained using the service information symbol, wherein the processor is changed over to an association process using a time period between the detection of the commodity information symbol and the detection of the service information symbol and an association process that does not depend on any time period, in accordance with the recognition by the processor, wherein the associating comprises associating commodity information and service information with each other without depending on any time period by using a commodity information symbol and a service information symbol which are successively detected, in a case where a commodity information symbol is detected after a service information symbol having no prior candidate for association therewith is detected and in a case where two service information symbols are successively detected after a commodity information symbol having no prior candidate for association therewith is detected.

6. A non-transitory computer readable medium storing a program causing at least one computer to perform an information processing method, the information processing method comprising:

detecting a commodity information symbol;
detecting a service information symbol;
recognize that a commodity information symbol has been detected after service information symbol having no prior candidate for association therewith is detected and that two service information symbols have been continuously detected after a commodity information symbol having no prior candidate for association therewith is detected; and associating, in a case where the service information symbol is detected between the detections of the two successive commodity information symbols, commodity information obtained using a commodity information symbol corresponding to a shorter time period, out of a time period from the detection of the earlier commodity information symbol to the detection of the service information symbol and a time period from the detection of the service information symbol and the detection of the later commodity information symbol, with service information obtained using the service information symbol, wherein the processor is changed over to an association process using a time period between the detection of the commodity information symbol and the detection of the service information symbol and an association process that does not depend on any time period, in accordance with the recognition by the processor, wherein the associating comprising associating commodity information and service information with each other without depending on any time period by using a commodity information symbol and a service information symbol which are successively detected, in a case where a commodity information symbol is detected after a service information symbol having no prior candidate for association therewith is detected and in a case where two service information symbols are successively detected after a commodity information symbol having no prior candidate for association therewith is detected.

* * * * *